United States Patent
Musashi et al.

(10) Patent No.: US 7,305,966 B2
(45) Date of Patent: Dec. 11, 2007

(54) SENSOR MODULE UNIT AND A THROTTLE APPARATUS EQUIPPED WITH THE SENSOR MODULE UNIT

(75) Inventors: Kazuhiro Musashi, Odawara (JP); Shigeru Yamazaki, Odawara (JP)

(73) Assignee: Mikuni Corporation, Tokyo (JP)

( * ) Notice: Subject to any disclaimer, the term of this patent is extended or adjusted under 35 U.S.C. 154(b) by 127 days.

(21) Appl. No.: 10/546,326

(22) PCT Filed: Feb. 18, 2004

(86) PCT No.: PCT/JP2004/001778

§ 371 (c)(1),
(2), (4) Date: Aug. 19, 2005

(87) PCT Pub. No.: WO2004/074661

PCT Pub. Date: Sep. 2, 2004

(65) Prior Publication Data

US 2006/0231073 A1    Oct. 19, 2006

(30) Foreign Application Priority Data

Feb. 20, 2003  (JP)  ............... 2003-043116

(51) Int. Cl.
 *F02D 9/02* (2006.01)
(52) U.S. Cl. .............. 123/399; 123/337; 73/118.1
(58) Field of Classification Search ............... 123/399, 123/494, 337; 73/116, 118.1
See application file for complete search history.

(56) References Cited

U.S. PATENT DOCUMENTS 6,725,833 B1 *  4/2004 Irihune et al. ............ 123/399

2002/0023486 A1  2/2002  Watanabe et al.

FOREIGN PATENT DOCUMENTS

| EP | 1 128 168 A2 | 8/2001 |
|---|---|---|
| JP | 7-260534 | 10/1995 |
| JP | 9-250374 | 9/1997 |
| JP | 11-223508 | 8/1999 |
| JP | 11-294216 | 10/1999 |
| JP | 2001-207867 | 8/2001 |
| JP | 2001-311637 | 11/2001 |

\* cited by examiner

*Primary Examiner*—Erick Solis
(74) *Attorney, Agent, or Firm*—Wenderoth, Lind & Ponack, L.L.P.

(57) ABSTRACT

The present invention provides a sensor installation structure for installation of a plurality of sensors disposed on an inlet pipe side of an engine, and enables each of the sensors to be positioned in an accurate measuring position. A sensor module unit is integrally provided with a plurality of sensors necessary for fuel supply control and intake-air flow rate control in an internal-combustion engine, and has an intake-air temperature sensor holding portion installed with an intake-air temperature sensor, at least one of a throttle position sensor holding portion installed with a position sensor to detect an opening angle of a throttle valve in an intake throttle apparatus, and an intake-air pressure sensor holding portion installed with an intake-air pressure sensor, and a unit main body that integrally accommodates the intake-air temperature sensor holding portion, and the at least one of the throttle position sensor holding portion and the intake-air pressure sensor holding portion to position these holding portions in respective predetermined arrangement positions in the unit, whereby each of the sensors is positioned in a predetermined measuring position in the throttle apparatus when the unit main body is installed in the vicinity of a throttle axle of the intake throttle apparatus.

16 Claims, 10 Drawing Sheets

SENSOR MODULE UNIT AND A THROTTLE APPARATUS EQUIPPED WITH THE SENSOR MODULE UNIT

TECHNICAL FIELD OF THE INVENTION

The present invention relates to a structure for installing sensors to detect various kinds of data indispensable to fuel supply control and intake-air flow rate control of an internal-combustion engine.

BACKGROUND ART

In recent years, it has become common that an internal-combustion engine (hereinafter, referred to as an "engine" as appropriate) of a vehicle including at least a large-size motorcycle is controlled by an electronic control apparatus provided with a computer.

In the electronic control apparatus of the engine, various kinds of sensors to always detect an operational state and intake-air state of the engine are disposed in the engine and its peripheral apparatuses, and an ECU (Electronic Control Unit) that performs electronic concentrated engine control performs optimal control of the engine based on a variety of data sent from the various kinds of sensors.

In the engine, fuel such as gasoline and air are mixed, and this air mixed fuel is burned in a piston to produce torque, and therefore, optimization is important for intake-air flow rate control as well as fuel supply quantity control of the engine.

An intake-air flow rate to supply air to the engine is adjusted by a throttle apparatus provided on an inlet pipe side connected to the engine. The throttle apparatus is generally comprised of an intake-air cylindrical pipe provided with a throttle valve therein, and the intake-air flow rate is adjusted by adjusting an opening angle of the throttle valve (hereinafter, referred to as simply "throttle").

Accordingly, the ECU needs to always detect an opening angle of the throttle in the intake-air throttle apparatus with accuracy, and detection of this throttle opening angle is performed based on an output signal of a throttle position sensor (hereinafter, referred to as "TPS") disposed near the throttle.

The TPS is broadly divided into two types, a contact type and non-contact type. In the contact type, a potentiometer is installed to gear to an operation of a throttle, and a contact member is brought into contact with a resistant film, and thus a throttle opening angle is detected. In the non-contact type, a throttle opening angle is detected using a Hall element or MR element that is not in direct contact with a movable member gearing to the throttle.

The contact type TPS using the potentiometer requires high positioning precision when installed to a throttle body. In other words, after temporarily installing the TPS to a body of the throttle apparatus, it is necessary to adjust a position in the vicinity of a throttle axle while monitoring a signal output from the TPS (for example, see Patent Document JP H11-223508). Such an adjustment needs to be performed for each throttle body in a case of a multi-cylinder engine, and an assembling operation becomes extremely complicated. Further, it is necessary to install a plurality of sensors such as an intake-air temperature sensor and intake-air pressure sensor besides the TPS on an inlet pipe side of the engine, and operation for installing these sensors individually is complicated and reduces operational efficiency.

Hence, there are proposed a sensor integrated throttle body where the non-contact type TPS is used that does not require such complicated installing operation and adjustment, and is integrally installed to a throttle body together with other sensors (for example, see Patent Document JP H09-250374), and an installation structure where an ECU substrate, on which a plurality of sensors are assembled, is installed in a throttle body (for example, see Patent Document JP H11-294216).

However, in the sensor integrated throttle body as described in Patent Document JP H09-250374, since the throttle body itself serves as sensor mounting structure on which a plurality of sensors are mounted, there are provided large limitations on size of the throttle apparatus and internal and external shapes of the throttle body, and production cost is thus increased. Further, since each sensor is installed individually to a predetermined portion of the throttle body, installation operational efficiency is not improved greatly in a production process as compared to a conventional sensor installation method.

Further, in a method of installing an ECU substrate, on which a plurality of sensors are mounted, in a throttle body as disclosed in Patent Document JP H11-294216, the method contributes to reduction in operation of wiring between the sensors and ECU substrate, but imposes large limitations not only on size of the throttle apparatus and internal and external shapes of the throttle body, but also on size of the ECU substrate and arrangement positions of electric components on the substrate. Therefore, particularly, it is sometimes difficult to mount such a substrate on a small-size throttle apparatus for a two-wheel motorcycle or compact-sized car.

It is an object of the present invention to provide a sensor installation structure which remarkably facilitates installation of a plurality of sensors arranged on an inlet pipe side of an engine, enables each of the sensors to be positioned in an accurate measuring position, and does not need to impose large limitations on size and shape of an apparatus targeted for installation of the sensors.

SUMMARY OF THE INVENTION

In order to achieve the aforementioned object, the present invention provides a sensor module unit which is integrally provided with a plurality of sensors necessary for fuel supply control and intake-air flow rate control in an internal-combustion engine, and has an intake-air temperature sensor holding portion installed with an intake-air temperature sensor, at least one of a throttle position sensor holding portion, installed with a position sensor to detect an opening angle of a throttle valve in an intake throttle apparatus, and an intake-air pressure sensor holding portion installed with an intake-air pressure sensor, and a unit main body that integrally accommodates the intake-air temperature sensor holding portion, and the at least one of the throttle position sensor holding portion and the intake-air pressure sensor holding portion, to position the same in respective predetermined arrangement positions in the unit, whereby each of the plurality of sensors is positioned in a predetermined measuring position in the throttle apparatus when the unit main body is installed in the vicinity of a throttle axle of the intake throttle apparatus.

When the unit main body is installed in the intake throttle apparatus, the intake-air temperature sensor is positioned on an intake upstream side of the throttle valve, while the intake-air pressure sensor is positioned on an intake downstream side of the throttle valve if the unit has the intake-air pressure sensor holding portion.

Further, the unit is provided with an outside-air pressure sensor holding portion installed with an outside-air pressure sensor in a position adjacent the intake-air temperature sensor holding portion in the unit main body, substituting for or together with the intake-air pressure sensor holding portion, and thus flexibly supports a combination of sensors to be installed. The outside-air pressure sensor is arranged on the intake upstream side of the throttle valve when the unit is installed in the intake throttle apparatus.

Furthermore, a significant feature of the present invention is that the temperature sensor holding portion determines positioning in the vicinity of the throttle axle when the unit main body is installed in the intake throttle apparatus. The temperature sensor holding portion is a conduit projecting to reach an inner wall of a throttle body of the intake throttle apparatus, and positioning is performed by the conduit being engaged in an opening provided in the throttle body.

The throttle position sensor is a non-contact type position sensor such as a Hall element or MR element to detect an opening angle of the throttle valve. A need is thus eliminated for complicated installation and adjustment operation of the throttle position sensor.

Further, the sensor module unit is provided with a circuit substrate to which are connected sensor output lines from the plurality of sensors, and the circuit substrate has output signal adjusting means for converting at least a sensor output from the non-contact type position sensor into a predetermined output signal.

The circuit substrate is provided with interface means for transmitting outputs of the plurality of sensors, or the output signal, to an external electronic fuel injection control apparatus having an intake throttle valve control apparatus or intake throttle control apparatus.

The present invention further provides an intake throttle valve control apparatus and intake throttle apparatus including such a sensor module unit.

In the sensor module unit according to the present invention, when the unit main body is installed in the vicinity of the throttle axle of the intake throttle apparatus, each of a plurality of sensors is positioned in a predetermined measuring position in the throttle apparatus, whereby it is possible to remarkably facilitate installation of the plurality of sensors arranged on an inlet pipe side of an engine, thereby achieve positioning of each of the sensors in an accurate measuring position, and eliminate limitations on size and shape of an apparatus targeted for installation of the sensors.

DETAILED DESCRIPTION OF THE PREFERRED EMBODIMENTS

Embodiments of a sensor module unit according to the present invention will be described specifically below with reference to accompanying drawings.

Figure 1:
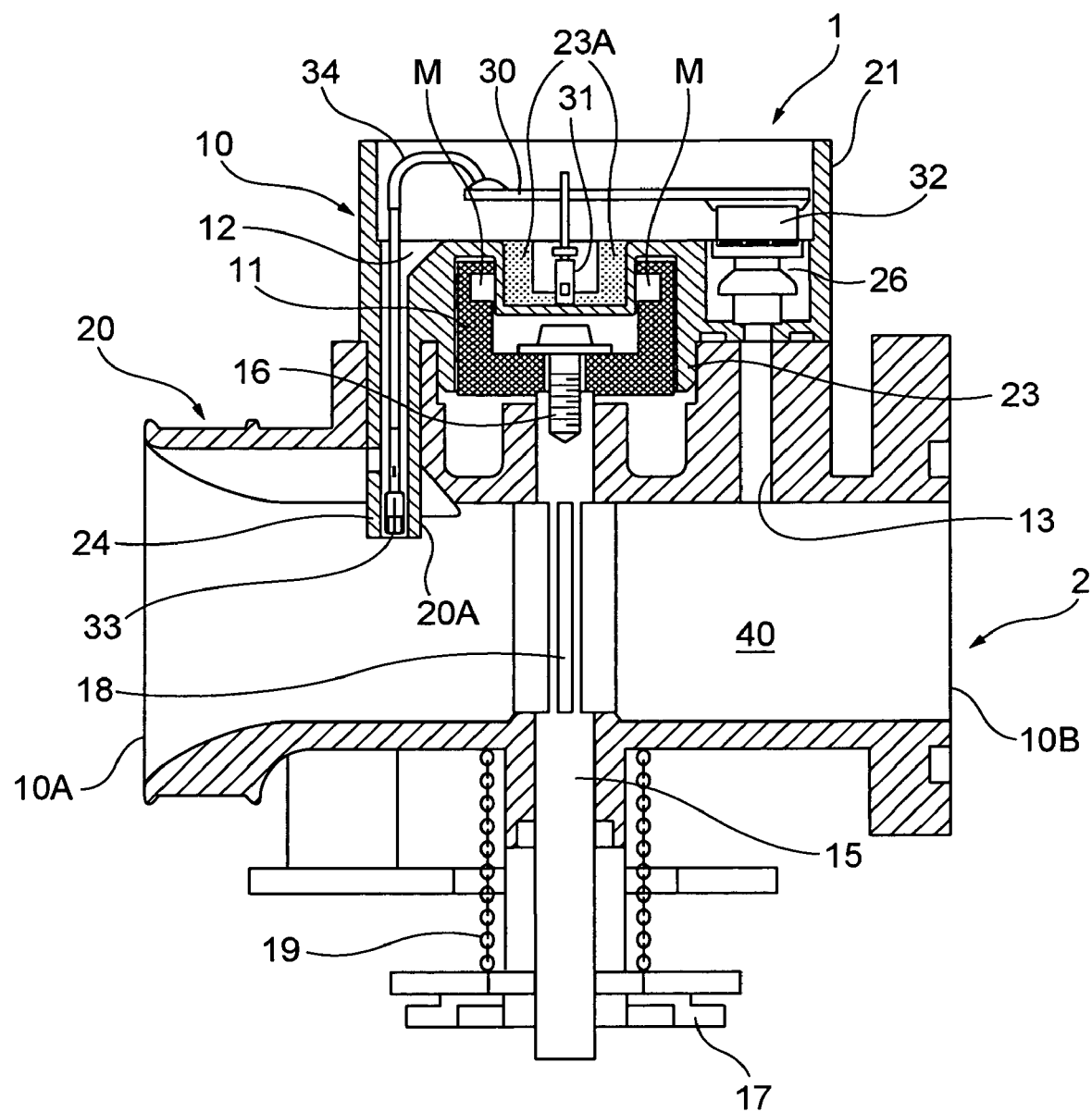
FIG. 1 is a cross sectional view showing a sensor module unit installed in a throttle apparatus according to the present invention.

FIG. 1 shows a sensor module unit 1 installed in a side surface of a throttle body 20 in the vicinity of a throttle axle 15 in a throttle apparatus 2.

In FIG. 1, as viewed in the figure, the left side of the throttle axle 15 is an intake upstream side (air-filter side), while the right side of the throttle axle 15 is an intake downstream side (engine side). The throttle body 20 is formed in the shape of a cylinder and provided with an air horn 10A at its left end and with a flange 10B at its right end.

Outside-air absorbed from an air inlet is filtered with an air filter (not shown), and this filtered air is supplied to the throttle apparatus 2 from the air horn 10A side. The throttle apparatus 2 increases or decreases a passage area of the filtered air by narrowing or widening an opening angle of a throttle valve 18 to control an intake-air flow rate to an engine. The throttle axle 15 to adjust the intake-air flow rate is provided substantially in a center of a side surface of the throttle body 20, and the throttle valve 18 is coupled to the throttle axle 15. An opening angle of the throttle valve 18 is detected by using a non-contact type position sensor (TPS), for example, provided with a Hall element 31 as described specifically later.

Further, as shown in FIG. 1, an intake-air temperature sensor 33 is disposed on an intake upstream side of the throttle valve 18, while an intake-air pressure sensor 32 is disposed on an intake downstream side of the throttle valve 18. Non-contact type TPS 31 or the like, intake-air pressure sensor 32 and intake-air temperature sensor 33 are respectively held by a TPS holding portion 23A, intake-air pressure sensor holding portion 26 and intake-air temperature sensor holding portion 24 provided in respective predetermined positions in a unit main body 10.

In this way, when the sensor module unit 1 is installed in the vicinity of the throttle axle 15 of the intake throttle apparatus 2, each of various sensors is positioned in a predetermined measuring position in the throttle apparatus 2. Herein, the intake-air temperature sensor 33 is positioned on the intake upstream side of the throttle valve 18, while the intake-air pressure sensor 32 is positioned in a predetermined position on the intake downstream side of the throttle valve 18. Further, as shown in FIG. 1, the throttle body 20 is provided with a projection 23 substantially in the shape of a cylinder. By such projection, positioning of the TPS 31 and other sensors is determined.

As shown in FIG. 1, a circuit substrate 30 is provided inside a case 21 of the sensor module. The circuit substrate 30 is fixed to a predetermined portion of the unit main body 10 of the sensor module unit 1. On the circuit substrate 30 are mounted the Hall element 31 constituting the TPS, intake-air pressure sensor 32, and a lead 34 from the temperature sensor 33 provided at a front end of conduit 24 (holding portion of the intake-air temperature sensor) projecting to an intake cylinder of the throttle apparatus 2. These elements are connected to an electronic control circuit on the circuit substrate 30 via terminals of a connector 28 (see FIGS. 7 and 8) mounted on the circuit substrate 30.

The Hall element 31 constituting the TPS 31 is disposed in a stator accommodating portion 23A formed in substantially cylinder-shaped projection 23, and inside the stator accommodating portion 23A is disposed a stator composed of magnetic material formed in a predetermined shape to control a magnetic field in the vicinity of the Hall element 31.

The intake-air temperature sensor 33 is supported in the intake-air temperature sensor holding portion 24 that is a conduit projecting to reach an inner wall of the throttle body 20 of the intake throttle apparatus 2. The conduit 24 is engaged in an opening 20A provided in the throttle body 20, whereby positioning in the vicinity of the throttle axle is performed when the unit main body 10 is installed in the intake throttle apparatus 2.

A rotor 11 constituting the TPS 31 is connected to the throttle axle 15. The rotor 11 is fixed to the throttle axle 15 by a screw 16, and thereby rotates together with the throttle axle 15 in an integrated manner. The throttle axle 15 penetrates the throttle body 20 and crosses substantially its center. The throttle axle 15 penetrating the throttle body 20 is coupled to a throttle lever 17 at an end portion opposite to the rotor 11. The throttle axle 15 is provided with the throttle valve 18 in a passage 40 inside the throttle body 20, and adjusts an intake air amount passing through the passage 40 corresponding to its position (angle). In other words, a rotational angle of the rotor 11 is correlated with an opening angle of the throttle valve 18. A return spring 19 is engaged in the throttle axle 15 through the throttle lever 17.

A magnet M is provided in part of an inner periphery of the rotor 11 along the periphery. When the unit main body 10 is installed in the throttle body 20, the magnet M is arranged along an outer periphery of the stator accommodating portion 23A. In other words, the TPS is comprised of the rotor 11, Hall element 31 and stator, detects variations in magnetic field due to rotation of the rotor 11 corresponding to a position of the throttle valve 18 using the Hall element 31, and thus detects a position of the throttle valve 18.

An intake-air temperature sensor installation opening 12 and intake-air pressure measuring conduit 13 are both communicated between a passage inside the throttle body 20 and outside. Further, for example, two screw holes 14 are provided to install the unit main body 10 of the sensor module unit so that the rotor 11 exists between the holes (see FIG. 6).

A combination of a plurality of kinds of sensors assembled in the sensor module unit according to the present invention will be described below.

First Embodiment

Figure 2:
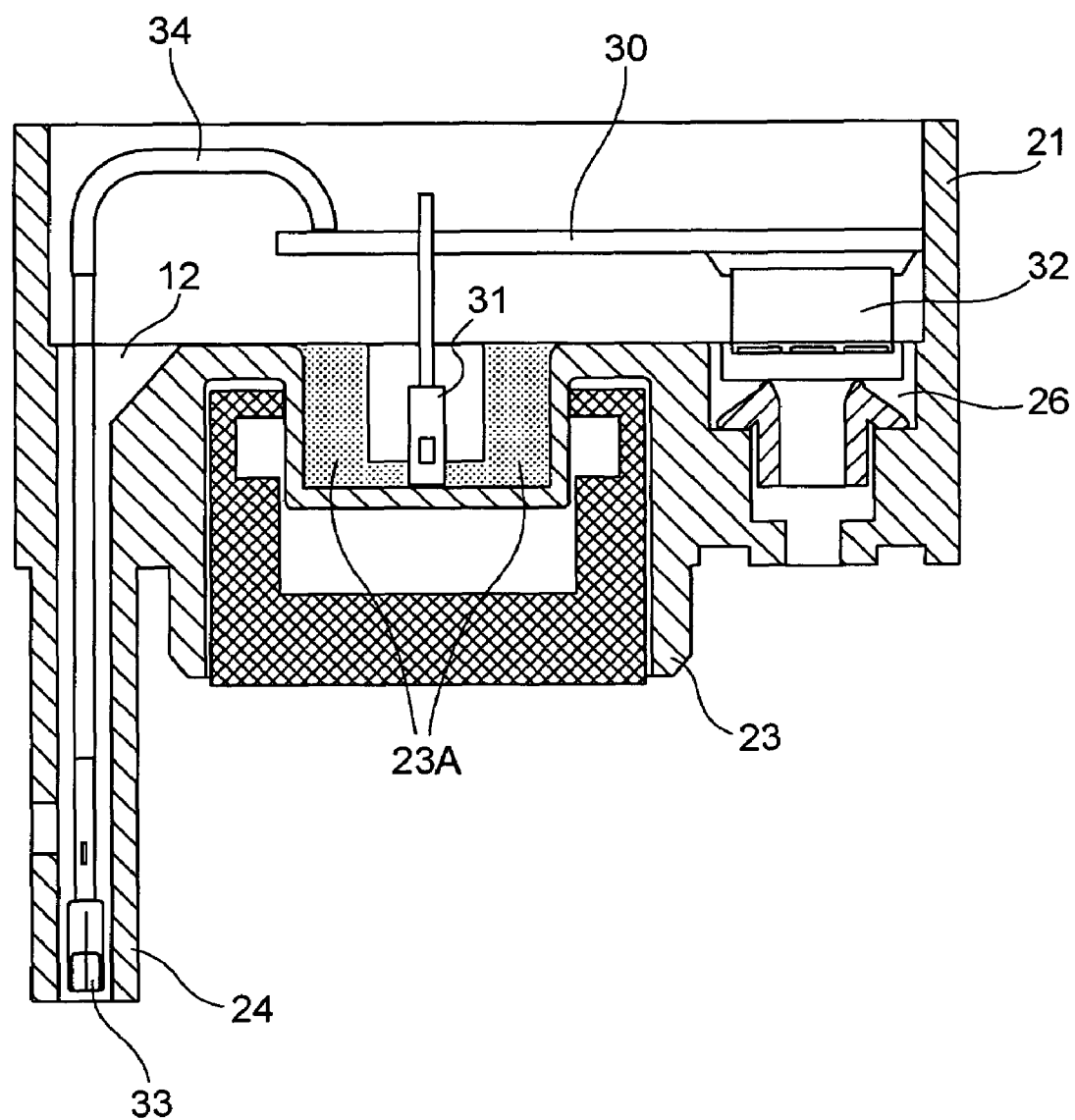
FIG. 2 is a view showing a first embodiment of the sensor module unit.

FIG. 2 shows a first embodiment of the sensor module unit according to the present invention as shown in FIG. 1.

The sensor module unit according to the first embodiment has three sensors, intake-air temperature sensor 33, TPS 31, and intake-air pressure sensor 32.

Therefore, the sensor module unit is provided with intake-air temperature sensor holding portion 24 installed with the intake-air temperature sensor, TPS holding portion 23A and intake-air pressure sensor holding portion 26 in respective predetermined positions in the unit main body 10.

Herein, the intake-air temperature sensor holding portion 24 is comprised of a conduit projecting to reach the inner wall of the throttle body 20 of the intake throttle apparatus 2 (FIG. 1), and the conduit is engaged in the opening 20A provided in the throttle body 20, whereby positioning in the vicinity of the throttle axle is performed when the unit main body 10 is installed in the intake throttle apparatus 2. At the same time, the intake-air temperature sensor 33 is positioned on the intake upstream side of the throttle valve 18, while the intake-air pressure sensor 32 is placed in a predetermined position on the intake downstream side of the throttle valve 18.

In FIG. 2, the intake-air temperature sensor 33 is connected to circuit substrate 30 through lead 34, and the TPS 31 and intake-air pressure sensor 32 are directly mounted on the circuit substrate.

The circuit substrate 30 is provided with output signal adjusting means for converting output signals of these sensors into predetermined output signals.

Second Embodiment

Figure 3:
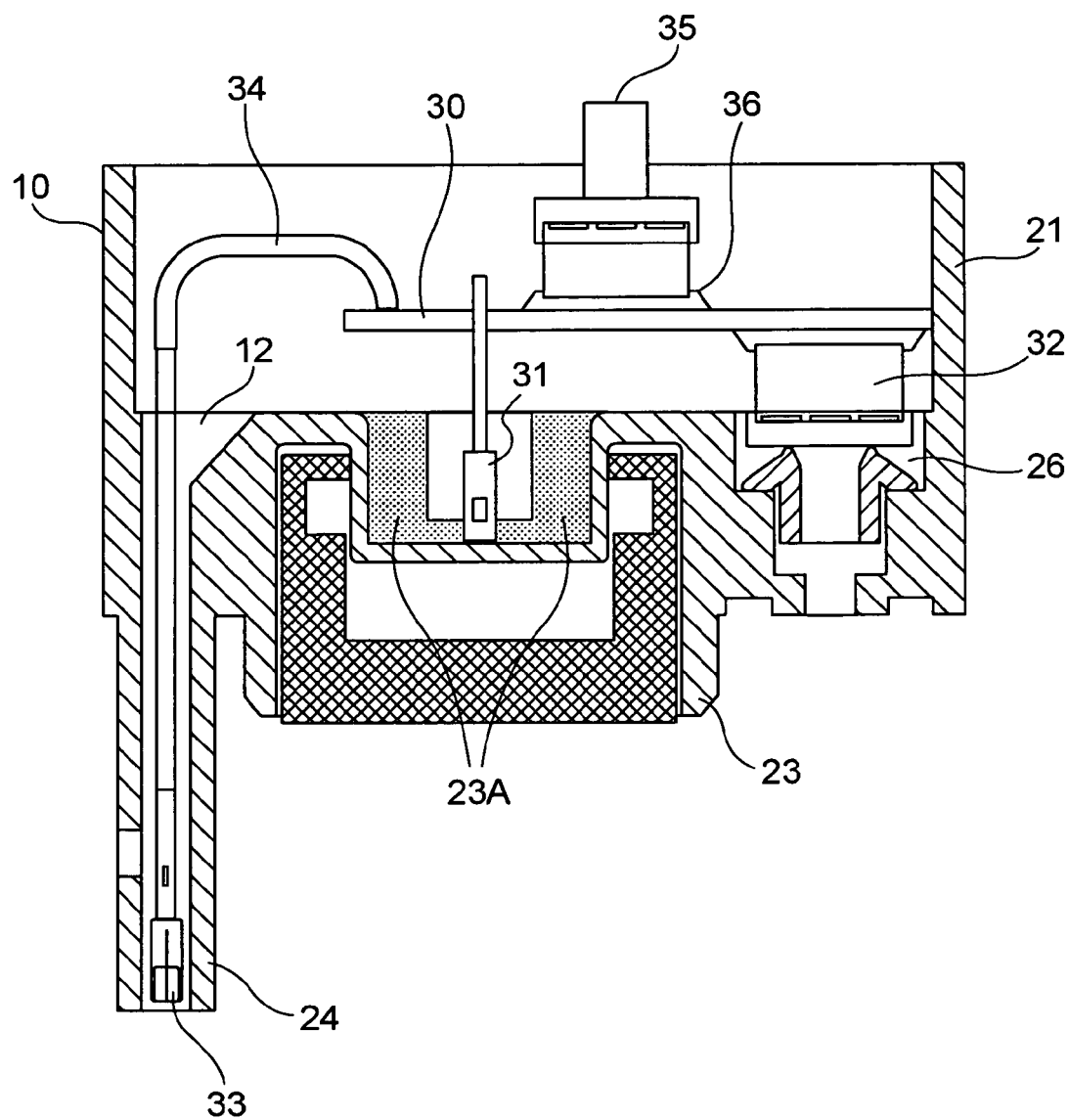
FIG. 3 is a view showing a second embodiment of the sensor module unit.

FIG. 3 shows a second embodiment of the sensor module unit according to the present invention.

The sensor module unit according to the second embodiment has four sensors, intake-air temperature sensor 33, TPS 31, intake-air pressure sensor 32, and outside-air pressure sensor 35.

Therefore, the sensor module unit is provided with intake-air temperature sensor holding portion 24 installed with the intake-air temperature sensor, TPS holding portion 23A, intake-air pressure sensor holding portion 26 and outside-air pressure sensor holding portion 36 in respective predetermined positions in unit main body 10.

Herein, the outside-air pressure sensor 35 is installed so that a sensor surface faces upward to detect air pressure outside the unit main body 10.

In addition, in the same way as in the first embodiment as described above, the intake-air temperature sensor holding portion 24 is comprised of a conduit projecting to reach the inner wall of the throttle body 20 of the intake throttle apparatus 2 (FIG. 1), and the conduit is engaged in opening 20A provided in the throttle body 20, whereby positioning in the vicinity of the throttle axle is performed when the unit main body 10 is installed in the intake throttle apparatus 2. At the same time, the intake-air temperature sensor 33 is positioned on the intake upstream side of the throttle valve 18, while the intake-air pressure sensor 32 is placed in a predetermined position on the intake downstream side of the throttle valve 18. Further, the outside-air pressure sensor 35 is arranged in a position for detecting air pressure outside the unit main body 10.

In FIG. 3, the intake-air temperature sensor 33 is connected to the circuit substrate 30 through lead 34, and the TPS 31 and intake-air pressure sensor 32 are directly mounted on the circuit substrate.

The circuit substrate 30 is provided with output signal adjusting means for converting output signals of these sensors into predetermined output signals.

Third Embodiment

Figure 4:
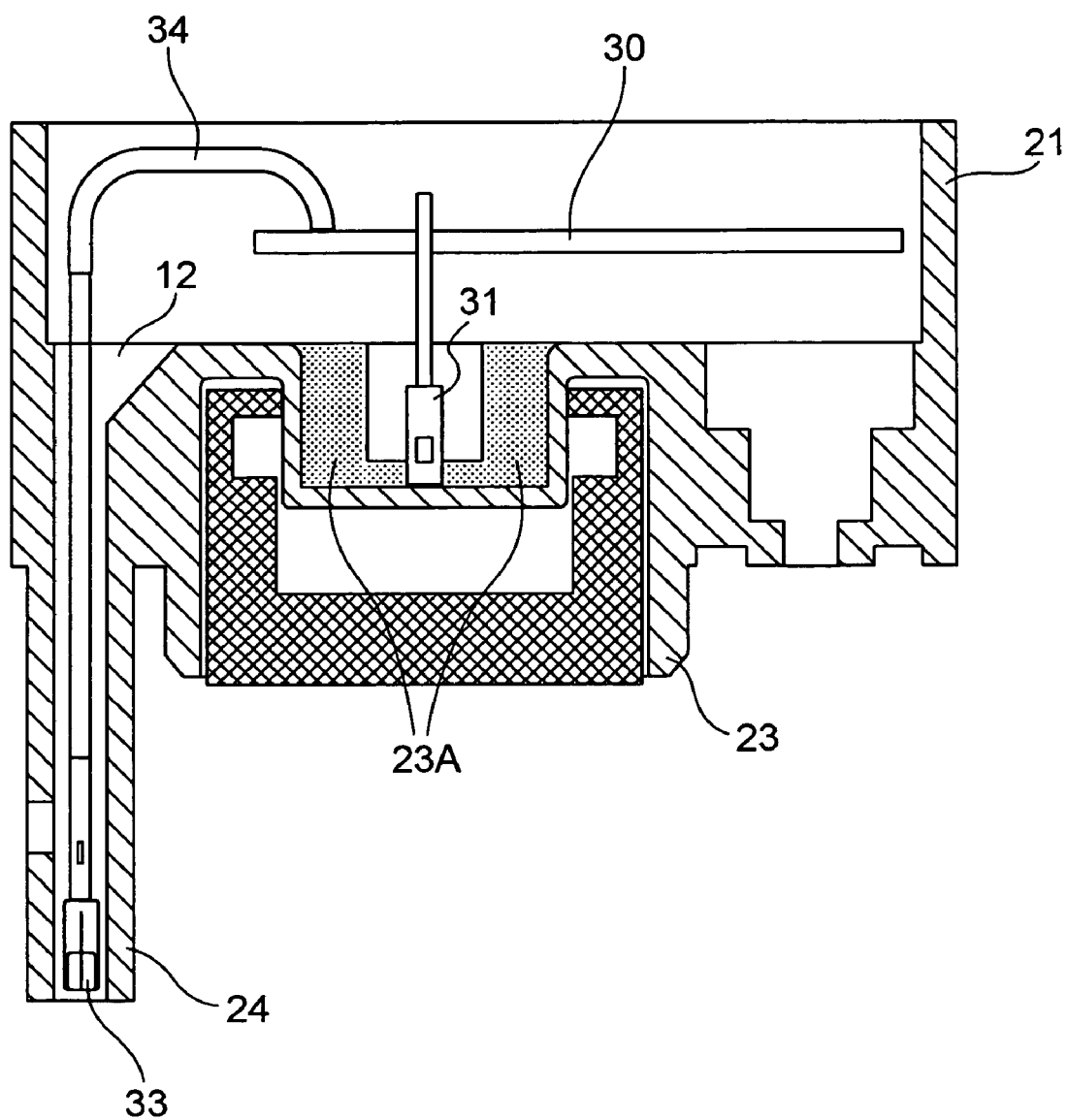
FIG. 4 is a view showing a third embodiment of the sensor module unit.

FIG. 4 shows a third embodiment of the sensor module unit according to the present invention.

The sensor module unit according to the third embodiment has two sensors, intake-air temperature sensor 33 and TPS 31.

Therefore, the sensor module unit is provided with intake-air temperature sensor holding portion 24 installed with the intake-air temperature sensor and TPS holding portion 23A in respective predetermined positions in unit main body 10.

In addition, in the same way as in the first and second embodiments as described above, the intake-air temperature sensor holding portion 24 is comprised of a conduit projecting to reach the inner wall of the throttle body 20 of the intake throttle apparatus 2 (FIG. 1), and the conduit is engaged in the opening 20A provided in the throttle body 20, whereby positioning in the vicinity of the throttle axle is performed when the unit main body 10 is installed in the intake throttle apparatus 2. At the same time, the intake-air temperature sensor 33 is positioned on the intake upstream side of the throttle valve 18.

In FIG. 4, the intake-air temperature sensor 33 is connected to circuit substrate 30 through lead 34, and the TPS 31 is directly mounted on the circuit substrate.

The circuit substrate 30 is provided with output signal adjusting means for converting output signals of these sensors into predetermined output signals.

Fourth Embodiment

Figure 5:
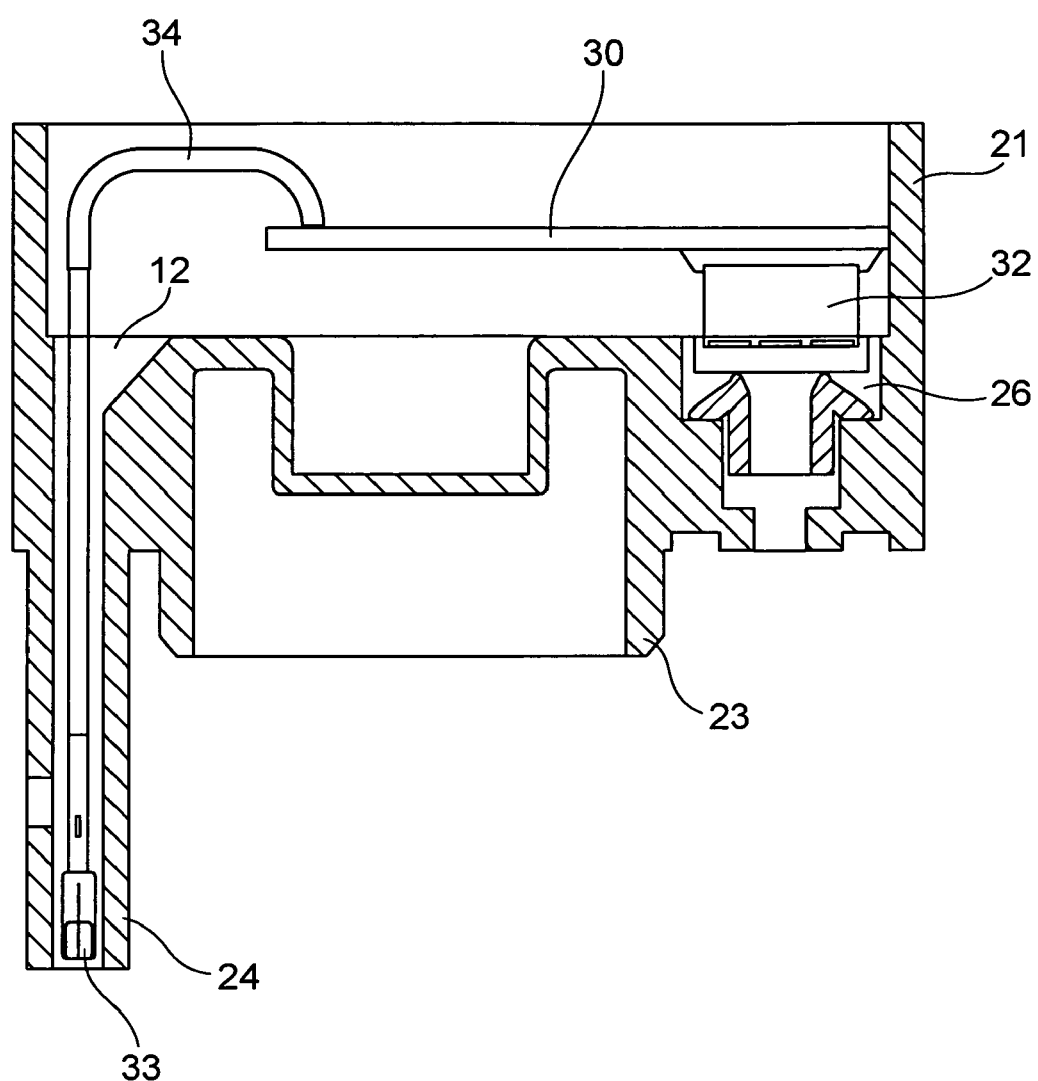
FIG. 5 is a view showing a fourth embodiment of the sensor module unit.

FIG. 5 shows a fourth embodiment of the sensor module unit according to the present invention.

The sensor module unit according to the fourth embodiment has two sensors, intake-air temperature sensor 33 and intake-air pressure sensor 32.

Therefore, the sensor module unit is provided with intake-air temperature sensor holding portion 24 installed with the intake-air temperature sensor and intake-air pressure sensor holding portion 26 in respective predetermined positions in unit main body 10.

In addition, in the same way as in the above-mentioned embodiments, the intake-air temperature sensor holding portion 24 is comprised of a conduit projecting to reach the inner wall of the throttle body 20 of the intake throttle apparatus 2 (FIG. 1), and the conduit is engaged in the opening 20A provided in the throttle body 20, whereby positioning in the vicinity of the throttle axle is performed when the unit main body 10 is installed in the intake throttle apparatus 2. At the same time, the intake-air temperature sensor 33 is positioned on the intake upstream side of the throttle valve 18, while the intake-air pressure sensor 32 is placed in a predetermined position on the intake downstream side of the throttle valve 18.

In FIG. 5, the intake-air temperature sensor 33 is connected to circuit substrate 30 through lead 34, and the intake-air pressure sensor 32 is directly mounted on the circuit substrate.

The circuit substrate 30 is provided with output signal adjusting means for converting output signals of these sensors into predetermined output signals.

Figure 6:
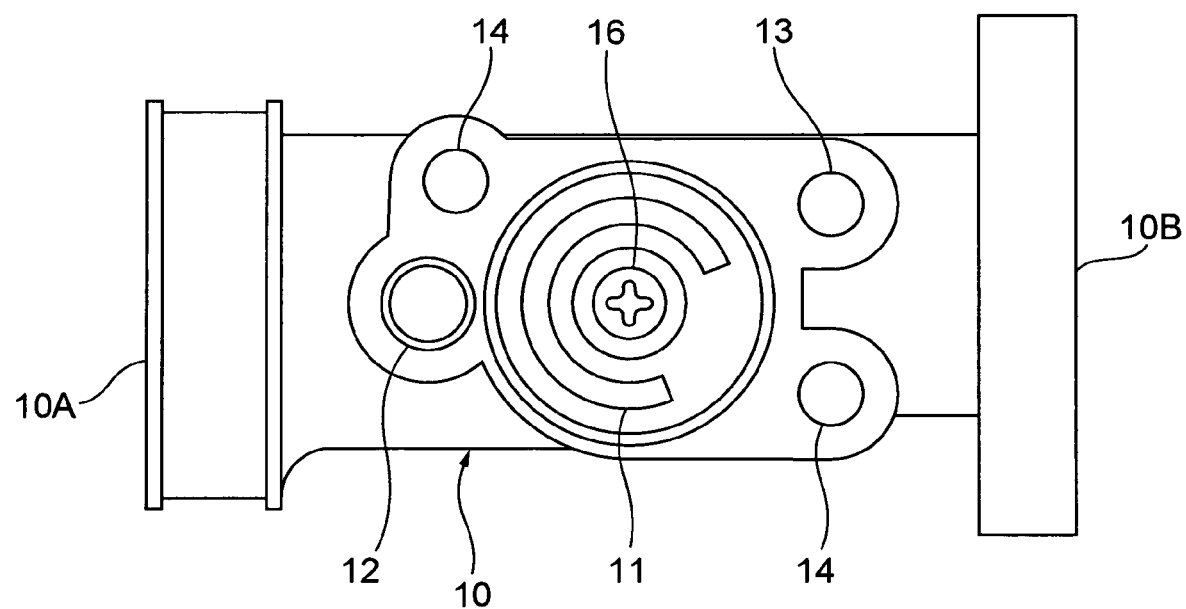
FIG. 6 is a side view of a throttle body in the throttle apparatus.

FIG. 6 shows a side view of the throttle apparatus 2 in which the sensor module unit 1 is installed, and thus shows a side-surface side of the throttle body 20 of the throttle apparatus 2 using a butterfly valve as the throttle valve of the throttle apparatus.

In FIG. 6, substantially in the center of the side surface of the throttle body 20 is provided the rotor 11 coupled to the throttle axle 15 to adjust the intake-air flow rate. The throttle body 20 is formed in the shape of a cylinder and provided with the air horn 10A at its left end and with the flange 10B at its right end. On an intake upstream side (left side) of the rotor 11 is formed the temperature sensor installation opening 12 (see FIG. 6) to install the intake-air temperature sensor (see FIGS. 2 to 5). On an intake downstream side (right side) of the rotor 11 is formed the pressure measuring conduit 13 (see FIG. 6) to measure a negative pressure rearward of the throttle valve.

The temperature sensor installation opening 12 and pressure measuring conduit 13 are both communicated between the passage inside the throttle body 20 and outside. Further, for example, the two screw holes 14 are provided to install the unit main body 10 (FIGS. 2 to 5) so that the rotor 11 exists between the holes.

Figure 7:
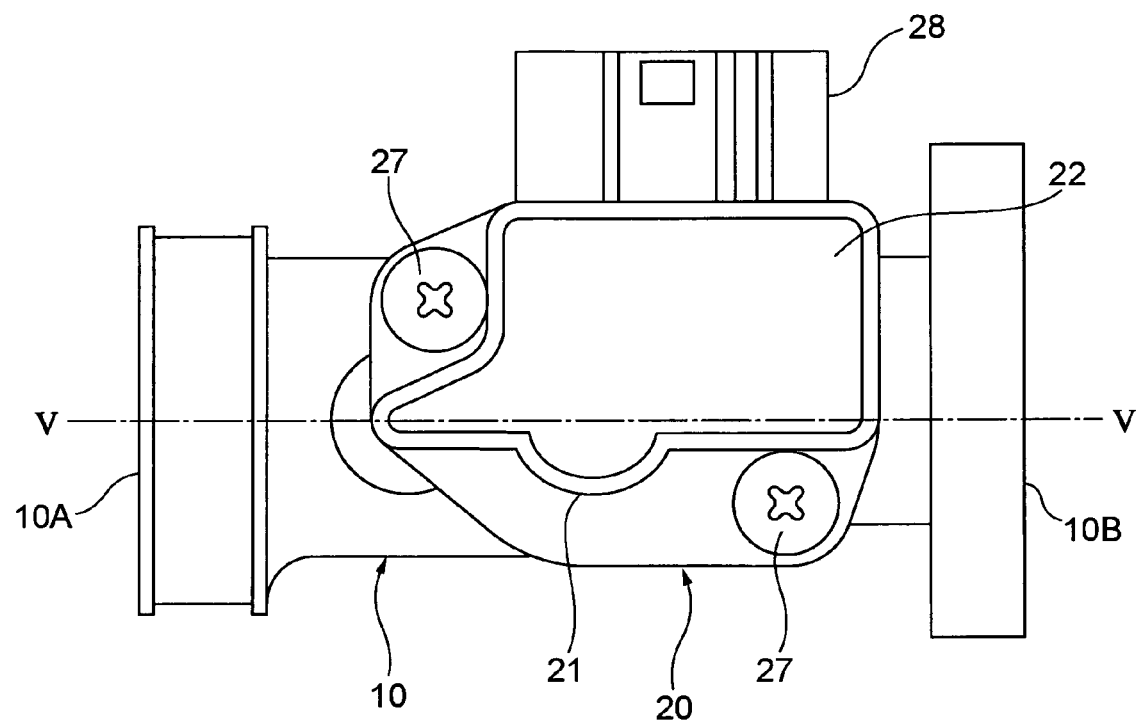
FIG. 7 is a side view of the throttle body in which the sensor module unit is installed.

FIG. 7 shows the unit main body 10 installed in the throttle body 20 of FIG. 6.

Figure 8:
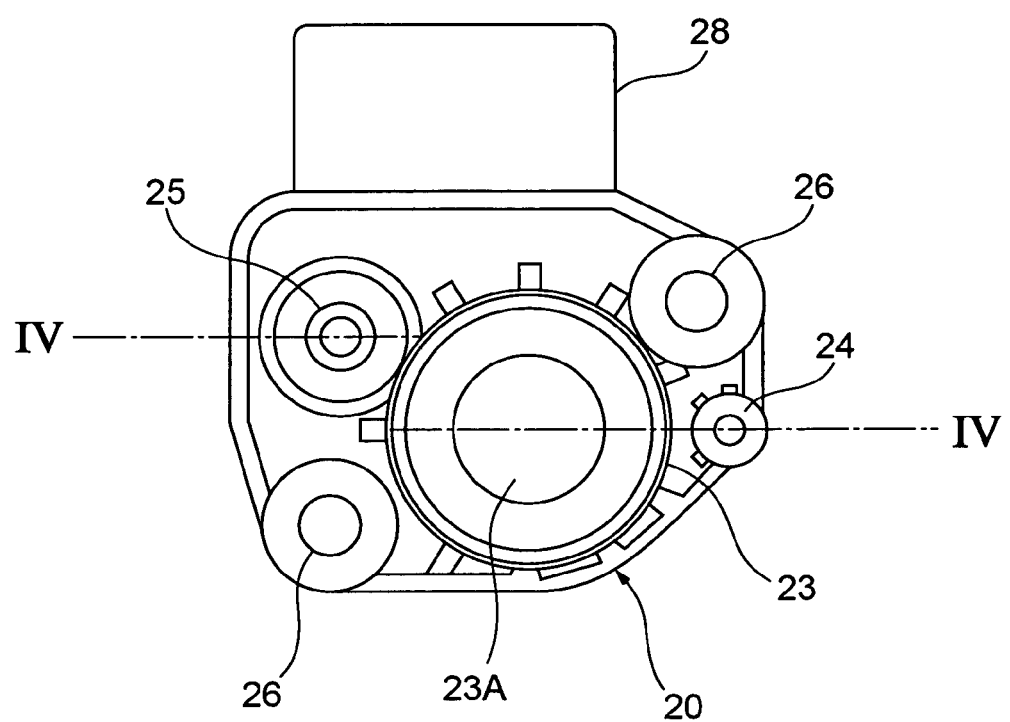
FIG. 8 is a plan view of the sensor module unit viewed from a side to be installed.

FIG. 8 shows a plan view of the unit main body 10 viewed from a side (back side) to be installed in the throttle body 20.

As described earlier, the case 21 of the sensor main body as shown in FIG. 7 stores the circuit substrate 30 (see FIGS. 1 to 5) mounted with the intake-air temperature sensor 33, non-contact type TPS 31, intake-air pressure sensor 32, and the like, and is sealed with a seal 22.

Further, as shown in FIG. 8, on a back side of the unit main body 10 are provided the rotor 11 (FIG. 6), temperature sensor installation opening 12, pressure measuring conduit 13, rotor engaging portion 23 in a position corresponding to each of the screw holes 14, temperature sensor conduit 24, pressure sensor holding portion 25 and two through holes 26.

The rotor engaging portion 23 is formed of a cylindrical wall slightly larger than the rotor 11. Cylinder-shaped stator accommodating portion 23A is formed in a center inside the portion 23. The rotor 11 is engaged between the cylindrical wall of the rotor engaging portion 23 and stator accommodating portion 23A turnably. The temperature sensor conduit 24 projects vertically from the back side of the unit main body 10 and is provided at its front end with the temperature sensor (see FIGS. 2 to 5). When installing the unit main body 10 in the throttle body 20, the temperature sensor conduit 24 is inserted into the temperature sensor installation opening 12. In this way, the unit main body 10 is positioned in the vicinity of an axle of the rotor engaging portion 23. In addition, the temperature sensor conduit 24 is configured to reach inside the throttle body 20 through the temperature sensor installation opening 12, and thus is prevented from being affected by heat of the throttle body.

When the unit main body 10 is positioned, the pressure sensor holding portion 25 is arranged in a position in accordance with the pressure measuring conduit 13, and pressure inside the throttle body 20 is guided to the pressure sensor holding portion 25. Finally, the unit main body 10 is fixed to the throttle body 20 with two screws 27. In other words, the screws 27 pass through two of the through holes 26 provided in the unit main body 10 and fastened in the screw holes 14 provided on the side surface of the throttle body 20, respectively.

A connector 28 is provided in the unit main body 10, and is connected to an electronic control circuit (not shown) through a signal cable (not shown). A plurality of terminals (not shown) are provided inside the connector 28 and connected to the circuit substrate provided inside the sensor circuit case 21. In addition, the electronic control circuit has low resistance to heat, and therefore, is provided in a position spaced an adequate distance apart from the throttle body 20.

Figure 9:
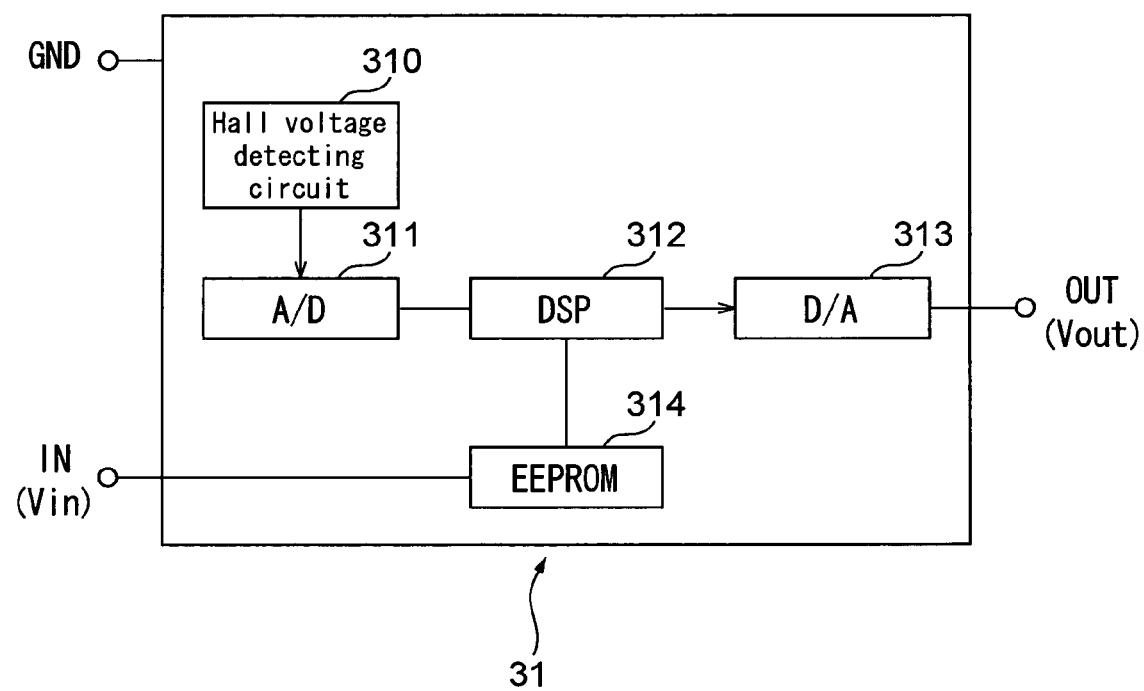
FIG. 9 is a block diagram schematically showing an electrical structure of a Hall element constituting a non-contact type throttle position sensor.

Initialization processing (output adjustment) of the TPS using the Hall element 31 will be described below with reference to FIGS. 9 and 10. FIG. 9 is a block diagram schematically showing an electrical structure of the Hall element 31, and FIG. 10 is a graph showing a relationship between an angle of the throttle valve 18 and an output voltage of the Hall element 31.

As shown in FIG. 9, the Hall element 31 is configured as an IC, and for example, is provided with a ground terminal GND, input terminal IN, and output terminal OUT. A Hall voltage detecting circuit 310 to detect a Hall voltage is provided in the Hall element 31, and outputs a signal corresponding to variations in a magnetic field in the vicinity. A signal output from the Hall voltage detecting circuit 310 is converted into a digital signal via an A/D converter 311, input to a DSP (Digital Signal Processor) circuit 312, and given predetermined digital signal processing.

Then, the signal is converted into an analog voltage signal via a D/A converter 313 and output from the output terminal OUT. Further, the DSP circuit 312 is connected to EEPROM 314, and signal processing in the DSP circuit 312 is controlled based on parameters stored in the EEPROM 314. Data is written in the EEPROM 314 by inputting a pulse modulated signal (Vin) to the input terminal IN. In addition, inputting a predetermined signal disables rewrite of the EEPROM 314.

Figure 10:
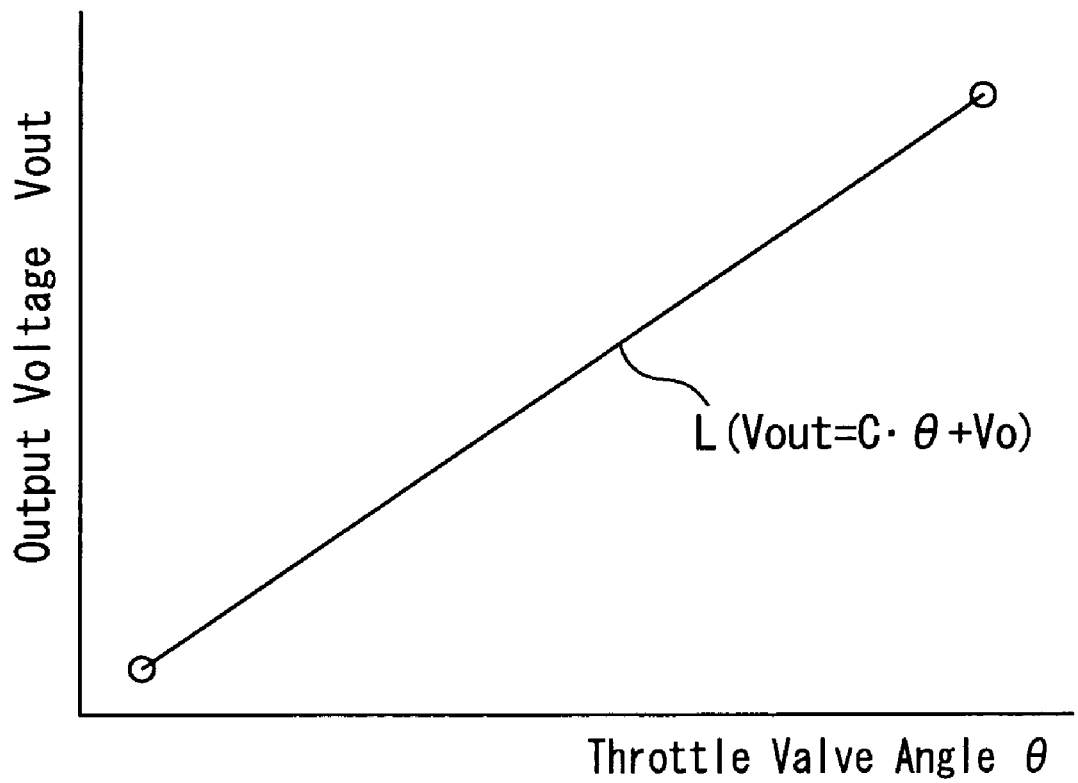
FIG. 10 is a graph showing a relationship between an angle of a throttle valve and an output voltage of the Hall element.

As shown in FIG. 10, a straight line L represents a relationship between angle θ of the throttle valve 18 and voltage Vout output from the output terminal OUT. In other words, voltage Vout is expressed by the following equation:

$$Vout = C*\theta + Vo$$

where C is a coefficient to control sensitivity of the Hall element 31 and Vo is an offset voltage. Values of coefficient C and offset voltage Vo can be written in EEPROM 314 as control parameters of the DSP circuit 312. In other words, output characteristics of the DSP circuit 312 are adjusted based on values of coefficient C and offset voltage Vo stored in the EEPROM 314.

In the TPS using the Hall element 31 of this embodiment, after installing the unit main body 10 in the throttle body 20, calibration is performed between angle θ of the throttle valve 18 and output Vout of the Hall element 31. A relationship between angle θ and output voltage Vout varies with each combination of throttle body 20 and unit main body 10. For example, the output voltage in a state where the throttle 18 is fully closed varies with each assembled product.

Based on a result of the calibration, the coefficient C and offset voltage Vo, that are control parameters of the DSP circuit 312, are written in the EEPROM 314, and a relationship between angle θ of the throttle valve 18 and output Vout from the TPS is adjusted to be an appropriate relationship.

As described above, according to this embodiment, since the TPS and other sensors can be installed as an integrated unit in the throttle body, it is possible to facilitate an operation for installing these sensors in the throttle body and improve efficiency in the operation. Further, in this embodiment, since the relationship between an output of the TPS and angle of the throttle valve is adjusted electrically, a need is eliminated for performing a mechanical adjustment by temporary fastening unlike a conventional technique, and operational efficiency is drastically improved.

When a plurality of sensors and TPS are installed as an integrated unit in the throttle body as in this embodiment, a positional relationship between sensors is predetermined in the unit. Accordingly, in installation, it is necessary to position the unit in the throttle body so that each sensor is arranged in a suitable position.

In the conventional technique, since a suitable position of the TPS in the vicinity of the axle varies with each assembled product, it is necessary to perform a fine adjustment of the position of the TPS in the vicinity of the axle, and it is difficult to form the TPS and other sensors in an integrated manner. However, in the sensor module unit, by using the non-contact type TPS, an electrical adjustment after installation substitutes for a relative fine adjustment of the TPS to the throttle valve in a rotational direction that is required to install the conventional TPS in the throttle body. In this way, a need is eliminated for performing positioning of the TPS with high precision, and it is made possible to beforehand construct the TPS and sensors other than the TPS in an integrated unit with a simple structure.

Further, in this embodiment, since the temperature sensor conduit is also used to position the sensor unit, it is not necessary to separately provide a member for positioning.

In addition, this embodiment describes a non-contact type TPS using a Hall element as an example, but it may be possible to use a sensor using an MR element other than the Hall element or an inductive type sensor.

Further, this embodiment describes the non-contact type TPS, intake-air pressure sensor and outside-air pressure sensor besides the intake-air temperature sensor, but the present invention is not limited to these sensors. Furthermore, the unit may be provided with a plurality of other sensors at the same time.

Moreover, in the sensor module unit, the intake-air temperature sensor conduit is used as a guide for positioning, but the intake-air pressure sensor holding portion or the like may be used as a guide for positioning.

INDUSTRIAL APPLICABILITY

The present invention relates to a sensor module unit provided with a plurality of sensors that facilitates installation, and adjustment subsequent to the installation, of sensors to detect various kinds of data indispensable to fuel supply control and intake-air flow rate control of an internal-combustion engine, and has industrially applicability.

The invention claimed is:

1. A sensor module unit, for association with an intake throttle apparatus including a throttle valve, for controlling fuel supply and an intake-air flow rate of an internal-combustion engine, comprising:

an intake-air temperature sensor holding portion installed with an intake-air temperature sensor;

an intake-air pressure sensor holding portion installed with an intake-air pressure sensor; and a unit main body integrally accommodating said intake-air temperature sensor holding portion and said intake-air pressure sensor holding portion so as to position these holding portions at respective predetermined arrangement positions of the sensor module unit, wherein said intake-air temperature sensor is on an intake upstream side of the throttle valve and said intake-air pressure sensor is on an intake downstream side of the throttle valve, when said unit main body is installed in the vicinity of a throttle axle of the intake throttle apparatus.

2. The sensor module unit according to claim 1, further comprising:

an outside-air pressure sensor holding portion installed with an outside-air pressure sensor, with said unit main body accommodating said outside-air pressure holding portion such that said outside-air pressure holding portion is adjacent said intake-air temperature sensor holding portion.

3. The sensor module unit according to claim 2, wherein said outside-air pressure sensor is arranged on the intake upstream side of the throttle valve, when said unit main body is installed in the vicinity of the throttle axle of the intake throttle apparatus.

4. The sensor module unit according to claim 3, wherein said intake-air temperature sensor holding portion is for determining positioning of said unit main body when said unit main body is installed in the vicinity of the throttle axle of the intake throttle apparatus.

5. The sensor module unit according to claim 4, wherein said intake-air temperature sensor holding portion comprises a conduit projecting so as to reach an inner wall of a throttle body of the intake throttle apparatus, such that said intake-air temperature sensor holding portion is for determining the positioning of said unit main body, when said unit main body is installed in the vicinity of the throttle axle of the intake throttle apparatus, by having said conduit become received within an opening provided in the throttle body.

6. The sensor module unit according to claim 2, wherein said intake-air temperature sensor holding portion is for determining positioning of said unit main body when said unit main body is installed in the vicinity of the throttle axle of the intake throttle apparatus.

7. The sensor module unit according to claim 6, wherein said intake-air temperature sensor holding portion comprises a conduit projecting so as to reach an inner wall of a throttle body of the intake throttle apparatus, such that said intake-air temperature sensor holding portion is for determining the positioning of said unit main body, when said unit main body is installed in the vicinity of the throttle axle of the intake throttle apparatus, by having said conduit become received within an opening provided in the throttle body.

8. The sensor module unit according to claim 1, further comprising:
a throttle position sensor holding portion installed with a position sensor to detect an opening angle of the throttle valve, said unit main body accommodating said throttle position sensor holding portion, and said position sensor being a non-contact type position sensor including an element selected from the group consisting of a Hall element and an MR element.

9. The sensor module unit according to claim 8, further comprising:
a circuit substrate to which are connected sensor output lines from said intake-air temperature sensor, said intake-air pressure sensor and said non-contact type position sensor, said circuit substrate having output signal adjusting means for converting at least an output from said non-contact type position sensor into a predetermined output signal.

10. The sensor module unit according to claim 9, wherein said circuit substrate further has interface means for transmitting outputs of said intake-air temperature sensor, said intake-air pressure sensor and said non-contact type position sensor, or transmitting the predetermined output signal, to an external electronic fuel injection control apparatus having an intake throttle valve control device or an intake throttle control device.

11. The sensor module unit according to claim 1, wherein said intake-air temperature sensor holding portion is for determining positioning of said unit main body when said unit main body is installed in the vicinity of the throttle axle of the intake throttle apparatus.

12. The sensor module unit according to claim 1, wherein said intake-air temperature sensor holding portion comprises a conduit projecting so as to reach an inner wall of a throttle body of the intake throttle apparatus, such that said intake-air temperature sensor holding portion is for determining the positioning of said unit main body, when said unit main body is installed in the vicinity of the throttle axle of the intake throttle apparatus, by having said conduit become received within an opening provided in the throttle body.

13. An intake throttle valve control apparatus including a sensor module unit, for association with an intake throttle apparatus including a throttle valve, for controlling fuel supply and an intake-air flow rate of an internal-combustion engine, said sensor module unit having
(i) an intake-air temperature sensor holding portion installed with an intake-air temperature sensor,
(ii) an intake-air pressure sensor holding portion installed with an intake-air pressure sensor, and
(iii) a unit main body integrally accommodating said intake-air temperature sensor holding portion and said intake-air pressure sensor holding portion so as to position these holding portions at respective predetermined arrangement positions of said sensor module unit,
wherein said intake-air temperature sensor is on an intake upstream side of the throttle valve and said intake-air pressure sensor is on an intake downstream side of the throttle valve, when said unit main body is installed in the vicinity of a throttle axle of the intake throttle apparatus.

14. An intake throttle apparatus having a throttle valve and an intake throttle valve control device including a sensor module unit for controlling fuel supply and an intake-air flow rate of an internal-combustion engine, said sensor module unit having
(i) an intake-air temperature sensor holding portion installed with an intake-air temperature sensor,
(ii) an intake-air pressure sensor holding portion installed with an intake-air pressure sensor, and
(iii) a unit main body integrally accommodating said intake-air temperature sensor holding portion and said intake-air pressure sensor holding portion so as to position these holding portions at respective predetermined arrangement positions of said sensor module unit,
wherein said intake-air temperature sensor is on an intake upstream side of the throttle valve and said intake-air pressure sensor is on an intake downstream side of the throttle valve, when said unit main body is installed in the vicinity of a throttle axle of the intake throttle apparatus.

15. A vehicle including an intake throttle apparatus having a throttle valve and an intake throttle valve control device including a sensor module unit for controlling fuel supply and an intake-air flow rate of an internal-combustion engine, said sensor module unit having
(i) an intake-air temperature sensor holding portion installed with an intake-air temperature sensor,
(ii) an intake-air pressure sensor holding portion installed with an intake-air pressure sensor, and
(iii) a unit main body integrally accommodating said intake-air temperature sensor holding portion and said intake-air pressure sensor holding portion so as to position these holding portions at respective predetermined arrangement positions of said sensor module unit,
wherein said intake-air temperature sensor is on an intake upstream side of the throttle valve and said intake-air pressure sensor is on an intake downstream side of the throttle valve, when said unit main body is installed in the vicinity of a throttle axle of the intake throttle apparatus.

16. An intake throttle valve control apparatus including a sensor module unit, for association with an intake throttle apparatus including a throttle valve, for controlling fuel supply and an intake-air flow rate of an internal-combustion engine, said sensor module unit having
- (i) an intake-air temperature sensor holding portion installed with an intake-air temperature sensor,
- (ii) an intake-air pressure sensor holding portion installed with an intake-air pressure sensor,
- (iii) an outside-air pressure sensor holding portion installed with an outside-air pressure sensor, and
- (iv) a unit main body integrally accommodating said intake-air temperature sensor holding portion, said intake-air pressure sensor holding portion, and said outside-air pressure sensor holding portion, so as to position these holding portions at respective predetermined arrangement positions of said sensor module unit such that said outside-air pressure holding portion is adjacent said intake-air temperature sensor holding portion, wherein said intake-air temperature sensor is on an intake upstream side of the throttle valve and said intake-air pressure sensor is on an intake downstream side of the throttle valve, when said unit main body is installed in the vicinity of a throttle axle of the intake throttle apparatus.

* * * * *